United States Patent
Johnson et al.

(10) Patent No.: US 7,360,412 B2
(45) Date of Patent: Apr. 22, 2008

(54) SINGLE POINT AND FIBER OPTIC TEMPERATURE MEASUREMENT FOR CORRECTION OF A GAS COLUMN WEIGHT IN A WELL

(75) Inventors: David O. Johnson, Spring, TX (US); Jose Sierra, Katy, TX (US); Christopher David, Bakersfield, CA (US)

(73) Assignee: Welldynamics B.V., Leiderdorp (NL)

( * ) Notice: Subject to any disclaimer, the term of this patent is extended or adjusted under 35 U.S.C. 154(b) by 40 days.

(21) Appl. No.: 11/356,466

(22) Filed: Feb. 16, 2006

(65) Prior Publication Data
US 2007/0186640 A1    Aug. 16, 2007

(51) Int. Cl.
*E21B 47/06* (2006.01)
*E21B 47/00* (2006.01)
(52) U.S. Cl. .................. 73/152.51; 73/152.52
(58) Field of Classification Search ............. 73/152.51, 73/152.52, 152.27, 152.54, 152.55, 152.46; 166/252.1, 250.01
See application file for complete search history.

(56) References Cited

U.S. PATENT DOCUMENTS

| | | | |
|---|---|---|---|
| 4,823,166 A | 4/1989 | Hartog et al. | ................. 356/44 |
| 4,976,142 A | 12/1990 | Perales | .................... 73/152.52 |
| 5,163,321 A | 11/1992 | Perales | .................... 73/152.52 |
| 6,176,323 B1 * | 1/2001 | Weirich et al. | ............... 175/40 |
| 6,206,108 B1 * | 3/2001 | MacDonald et al. | .......... 175/24 |

FOREIGN PATENT DOCUMENTS

WO    WO 01/01092    1/2001

* cited by examiner

*Primary Examiner*—Hezron Williams
*Assistant Examiner*—Tamiko Bellamy
(74) *Attorney, Agent, or Firm*—Smith IP Services, P.C.

(57) ABSTRACT

Fluid column weight correction using discrete point and fiber optic temperature measurement. A method for determining pressure at a distal end of a fluid column in a well includes the steps of: dividing the fluid column into multiple segments; determining a temperature of each segment; and determining a pressure and density for each segment. Another method includes the steps of: determining the temperature of each segment by measuring a temperature in the well near a proximal end of the fluid column, and using the measured temperature in conjunction with a thermal wellbore model to generate a temperature profile of the fluid column. Another method includes the steps of: causing a pressure change in the fluid column; recording multiple pressure measurements during the pressure change; and generating a temperature profile of the fluid column for each of the pressure measurements.

11 Claims, 4 Drawing Sheets

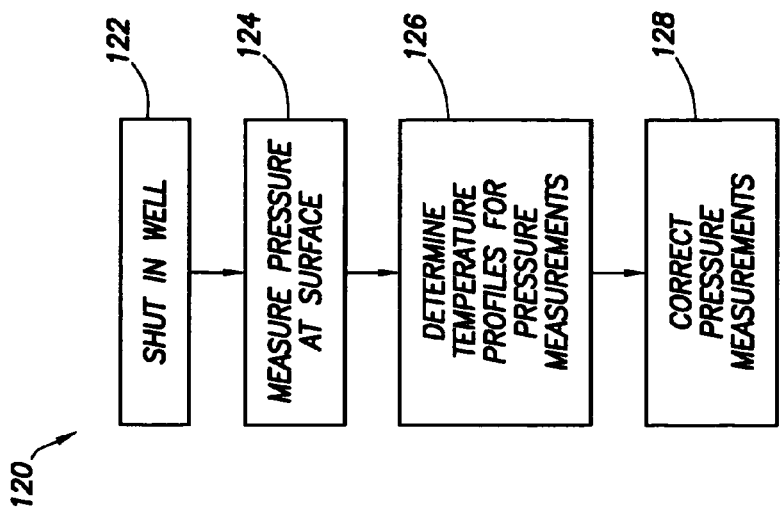
FIG. 11
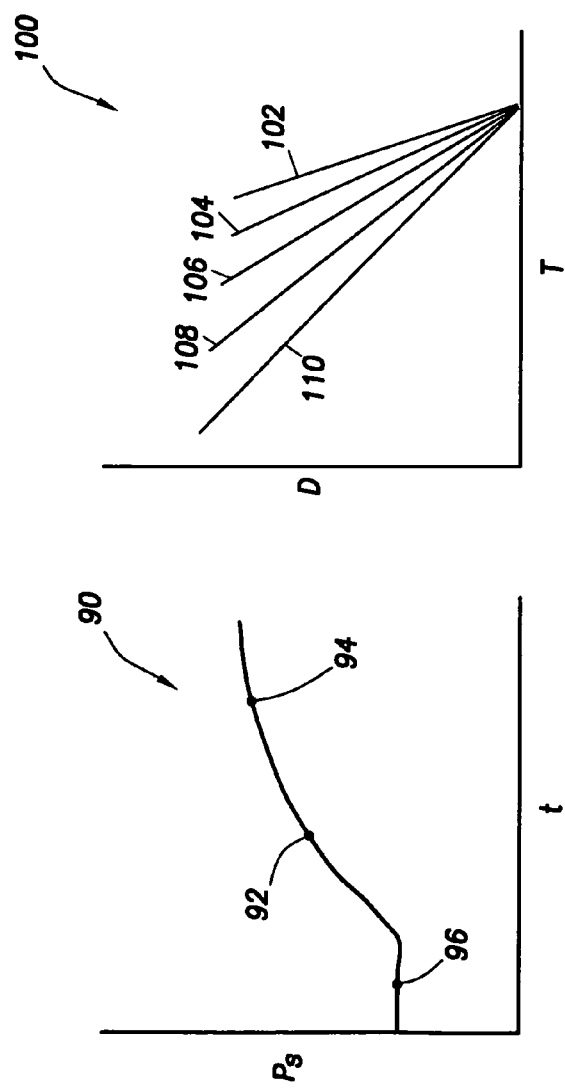
FIG. 10
FIG. 9

SINGLE POINT AND FIBER OPTIC TEMPERATURE MEASUREMENT FOR CORRECTION OF A GAS COLUMN WEIGHT IN A WELL

BACKGROUND

The present invention relates generally to methods and equipment utilized in conjunction with a subterranean well and, in an embodiment described herein, more particularly provides a fluid column weight correction using discrete point and fiber optic temperature measurement.

It is known to use a fluid column extending to the surface for measuring pressure in a well. An example of such a pressure measurement system is described in U.S. Pat. No. 5,163,321, the entire disclosure of which is incorporated herein by this reference.

Typically, a tube is inserted into the well from the surface to the depth at which pressure is to be monitored. The tube is then pressurized with a gas (such as helium or hydrogen) or other fluid. The tube is purged, so that it contains only the pressurized gas or other fluid, and the pressure at a proximal end of the tube is measured as an indication of pressure in the well at a distal end of the tube.

Of course, the weight of the fluid in the tube affects the pressure measurement, and so various attempts have been made in the past to correct the pressure measurement to account for the fluid weight. One method is to estimate an average temperature of the fluid, and then use this average temperature to estimate a density of the fluid, and thereby calculate a total weight of the fluid at the distal end of the tube. Another method is to use a distributed temperature sensing system to obtain a more accurate measurement of temperature along the tube, and then use this temperature distribution to estimate the density of the fluid and, thus, its weight.

It will be appreciated by those skilled in the art that these prior methods provide only rough estimates of the effect of the fluid weight on the pressure measurement. In particular, the fluid weight is not accurately determined, since it is based on inaccurate calculations of the fluid density. Therefore, it may be seen that improvements are needed in the art of correcting pressure measurements for fluid column weight.

SUMMARY

In carrying out the principles of the present invention, a method is provided which solves at least one problem in the art. One example is described below in which fluid column pressure measurements are corrected, in part by determining a pressure and temperature in each segment of the fluid column. Another example is described below in which fluid column pressure measurements are corrected, in part by determining a density in each segment of the fluid column.

A method is described for determining pressure at a distal end of a fluid column in a well. The method includes the steps of: dividing the fluid column into multiple segments; determining a temperature of each fluid column segment; and for each successive fluid column segment extending toward the distal end of the fluid column, determining a pressure in the fluid column segment and determining a density of the fluid column segment.

In an aspect of the invention, a method is provided which includes the steps of: dividing the fluid column into multiple segments; determining a temperature of each fluid column segment by measuring a temperature in the well near a proximal end of the fluid column, and using the measured temperature in conjunction with a thermal wellbore model to thereby generate a temperature profile of the fluid column. For each successive fluid column segment extending toward the distal end of the fluid column, a pressure in the fluid column segment and a density of the fluid column segment are determined.

In another aspect of the invention, a well testing method is provided which includes the steps of: shutting in the well, thereby causing a pressure increase at the distal end of the fluid column; monitoring the pressure increase over a time period at a proximal end of the fluid column, thereby recording multiple pressure measurements; and generating a temperature profile of the fluid column for each of the pressure measurements, each of the temperature profiles corresponding to a respective one of the pressure measurements at a time the pressure measurement is recorded. For each of the pressure measurements, a corrected pressure at the distal end of the fluid column is determined using the respective temperature profile.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

BRIEF DESCRIPTION OF THE DRAWINGS

FIG. 9 is a graph of pressure versus time in a well testing method embodying principles of the invention;

FIG. 10 is a graph of temperature versus depth for various temperature profiles generated by a thermal wellbore model in the well testing method; and FIG. 11 is a flowchart for the well testing method.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
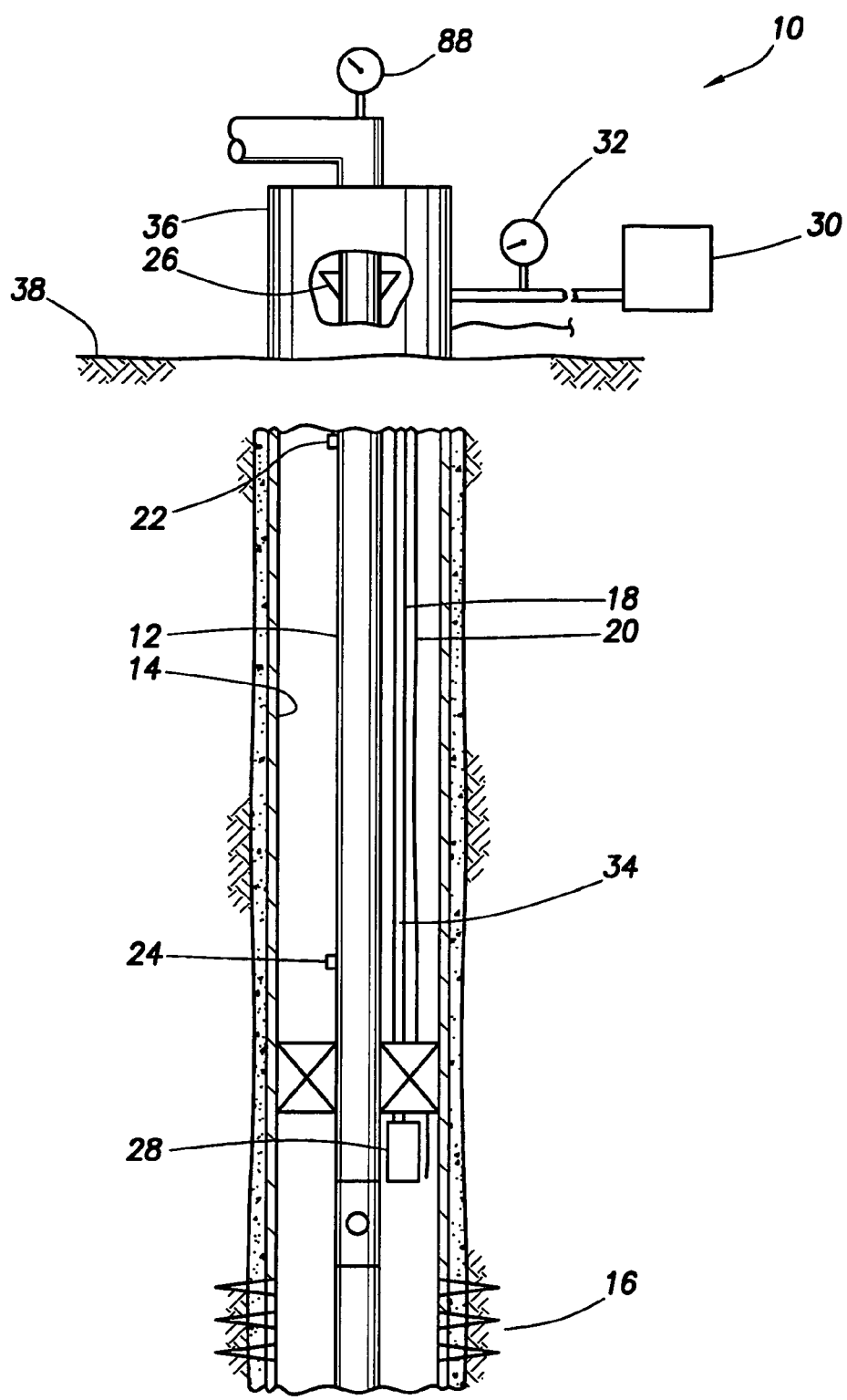
FIG. 1 is a partially cross-sectional schematic view of a well system embodying principles of the present invention.

Representatively illustrated in FIG. 1 is a well system 10 which embodies principles of the present invention. A tubular string 12 (such as a production or injection tubing string) is installed in a wellbore 14 of the well. The tubular string 12 is used to convey fluid between the surface and a formation or zone 16 intersected by the wellbore 14.

A tube or conduit 18 is positioned adjacent the tubular string 12. Preferably, the conduit 18 is installed along with the tubular string 12, but other installation methods could be used, if desired. In addition, an optical conductor 20 (such as a fiber optic line) is preferably positioned adjacent the conduit 18 for measuring a temperature along the wellbore 14.

Alternatively, or in addition, one or more temperature sensors 22, 24 may be positioned in the well. Preferably, at least one of the sensors 22 is positioned near the surface, but below a tubing hanger 26. The near surface location of the sensor 22 provides for convenient installation, retrieval, maintenance and communication with the sensor. The positioning of the sensor 22 prevents surface conditions (such as ambient temperature, etc.) from significantly affecting the temperature measurements.

If the other sensor 24 is used, it is preferably positioned at a location substantially spaced apart from the sensor 22. This spacing provides increased accuracy in determining a temperature profile in the well, as described more fully below. The sensor 24 may communicate with the surface via lines (such as electrical or optical conductors) or via telemetry.

An enlarged chamber 28 is preferably connected at a distal end of the conduit 18. A lower end of the chamber 28 is in communication with the wellbore 14 external to the tubular string 12. The chamber 28 provides a substantial internal volume for accommodating pressure fluctuations in the wellbore 14.

The conduit 18 and chamber 28 are purged by flowing a fluid having known properties through the conduit and into the chamber. The fluid may actually be a combination or mixture of fluids, and preferably has a density which is less than that of the fluid in the wellbore 14, so that pressure must be applied to the conduit 18 at the surface (e.g., using a pump, pressurized container or other pressure source 30) to prevent the well fluid from flowing upwardly through the conduit.

Pressure in the conduit 18 at the surface is monitored (for example, using a pressure gauge or other type of sensor 32) to provide an indication of the pressure in the wellbore 14 at the lower end of the chamber 28. It will be readily appreciated by those skilled in the art that a fluid column 34 extends from its proximal end at the surface to the chamber 28 at its distal end, and that the weight of the fluid column affects the pressure measurements made at the proximal end of the fluid column.

It should be clearly understood that, although in the well system 10 as described herein the proximal end of the fluid column 34 is located near a wellhead 36 at the earth's surface 38, the principles of the invention are not limited to this configuration. For example, the proximal end of the fluid column 34 could be located at a wellhead on a sea floor or mudline, on a floating or permanent platform, etc. Thus, the invention is not limited to the particular details of the well system 10 described herein, instead the well system is merely used as an example of an application of the principles of the invention.

Figure 2:
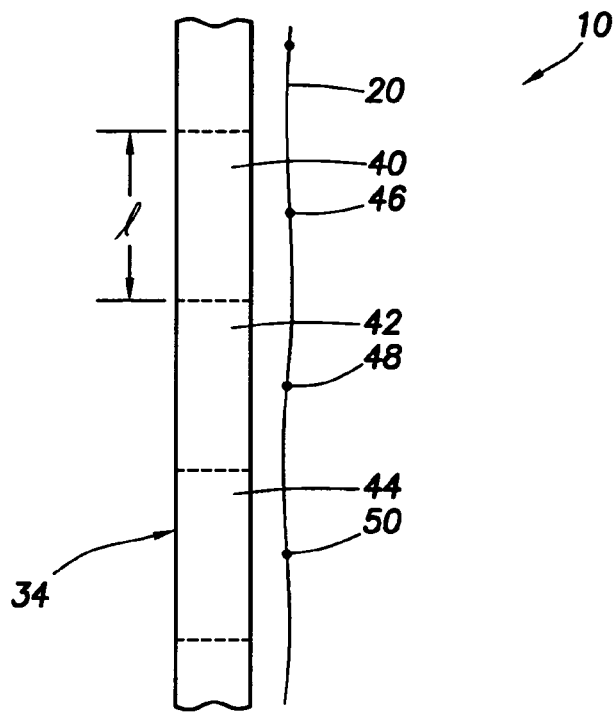
FIG. 2 is an enlarged scale side view of a fluid column in the system of FIG. 1.

Referring additionally now to FIG. 2, an enlarged scale illustration of a portion of the fluid column 34 is depicted. The fluid column 34 is divided into a series of successive segments 40, 42, 44. Although only three segments 40, 42, 44 are depicted in FIG. 2, preferably the entire fluid column 34, from its proximal end to its distal end, is divided up into similar segments, with each of the segments having an equal length l.

If the optical conductor 20 is used for temperature measurement in the wellbore 14, then preferably temperature measurements are made for each of the segments 40, 42, 44. For example, temperature measurements may be made at locations 46, 48, 50 along the optical conductor 20. These temperature measurements could be made by detecting Raman scattering in the optical conductor 20, by use of Bragg gratings along the optical conductor, or by any other method.

In FIG. 2, the optical conductor 20 is depicted as being closely adjacent the fluid column 34 for accurate temperature measurements along the fluid column. Many different configurations are possible, and a few of these are representatively illustrated in FIGS. 3-5.

Figure 3:
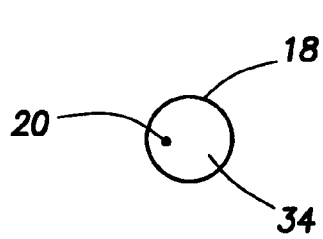
FIGS. 3-5 are cross-sectional schematic views of alternative arrangements of the fluid column and an optical conductor.

In FIG. 3, the optical conductor 20 is positioned inside the conduit 18, and is surrounded by or immersed in the fluid column 34. In one alternative, the optical conductor 20 could be incorporated into a cable or other line which is installed within the conduit 18, either prior to or after the conduit is installed in the wellbore 14.

Figure 4:
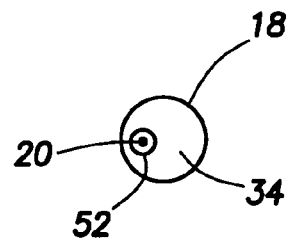

In FIG. 4, the optical conductor 20 is installed in a separate tube or conduit 52 within the conduit 18. In this manner, the optical conductor 20 is isolated from the fluid column 34.

Figure 5:
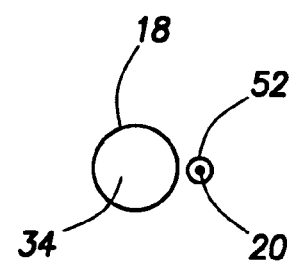

In FIG. 5, the optical conductor 20 is positioned within the conduit 52, but in this configuration the conduit 52 is external to the conduit 18. Thus, it will be readily appreciated that any arrangement of the optical conductor 20 relative to the fluid column 34 may be utilized, without departing from the principles of the invention.

Figure 6:
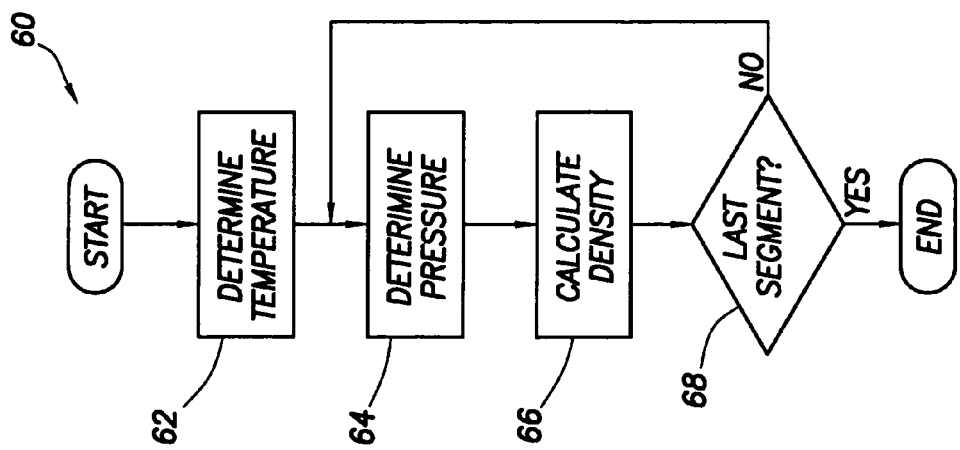
FIG. 6 is a flowchart for a method embodying principles of the present invention.

Referring additionally now to FIG. 6, a method 60 for determining the pressure in the wellbore 14 at the distal end of the fluid column 34 is representatively illustrated in flowchart form. The method 60 may be used with the well system 10 for correcting the pressure measurements made at the sensor 32, based on a weight of the fluid column 34. Of course, the method 60 may be used with other well systems in keeping with the principles of the invention.

An initial step 62 in the method 60 is to determine the temperature of each of the segments of the fluid column 34, from its proximal end to its distal end. Various techniques may be used in this step 62. As depicted in FIG. 2, the temperature of each segment may be directly measured using the optical conductor 20. Other techniques for determining the temperature of each of the segments are described below.

In step 64, a pressure in each of the segments of the fluid column 34 is determined. Using the sensor 32, pressure in the uppermost segment of the fluid column 34 may be directly measured. For each successive segment, however, the accumulated weight of the vertically higher segments cause an increased pressure in the segment. In other words, the pressure in each segment is equal to the sum of the pressure applied to the conduit 18 (e.g., from the pressure source 30) and the pressure due to the weight of the vertically higher segments.

As depicted in FIG. 2, the pressure in the segment 40 is equal to the pressure applied to the conduit 18 at the surface, plus the pressure due to the weight of all segments of the fluid column 34 above the segment 40. Similarly, the pressure in the segment 42 is equal to the pressure applied to the conduit 18 at the surface, plus the pressure due to the weight of all segments of the fluid column 34 above the segment 42, including the weight of the segment 40. Again, in a similar manner, the pressure in the segment 44 is equal to the pressure applied to the conduit 18 at the surface, plus the pressure due to the weight of all segments of the fluid column 34 above the segment 44, including the weights of the segments 40, 42.

The pressure in a particular segment due to the accumulated weight of the vertically higher segments is equal to the weight divided by the internal cross-sectional area of the conduit 18. If, for example, the accumulated weight of the vertically higher segments were 2 pounds, and the cross-sectional area of the conduit 18 were 0.1 square inch, then the pressure due to the weight of the vertically higher segments would be 20 psi. If the pressure applied to the conduit 18 at the surface were, for example, 2,000 psi, then the total pressure in the segment would be 2,020 psi.

In order to determine the weight of each of the segments of the fluid column 34, the density of each segment is determined in step 66. As discussed above, the fluid in the fluid column 34 has known properties, including a known relationship between the fluid temperature, pressure and density.

For a gas, this relationship may be represented, for example, by the Van Der Waals equation of state:

$$(P+a(n/V)^2)(V-nb)=nRT \qquad (1)$$

in which P is pressure, V is volume, T is temperature, R is the universal gas constant (8.314 J/mole/K), n is number of gram moles, and a and b are specific constants for each gas. For helium, $a=0.00341$ J $m^3$/$mole^2$ and $b=2.34\times10^{-5}$ $m^3$/mole. For hydrogen, $a=0.0247$ J $m^3$/$mole^2$ and $b=2.65\times10^{-5}$ $m^3$/mole. For nitrogen, $a=0.1361$ J $m^3$/$mole^2$ and $b=3.85\times10^{-5}$ $m^3$/mole.

Where the density of the gas is relatively low (e.g., helium at low pressure), then the ideal gas law (PV=nRT) may provide an acceptably accurate alternative to the Van Der Waals equation of state. Of course, if the fluid column 34 contains liquid, then an appropriate relationship between pressure, temperature and density for the liquid would be used instead.

The pressure P is provided in step 64 and the temperature T is provided in step 62. The density is n/V, expressed in terms of mass. When multiplied by the gravitational constant and the volume of the segment, the weight of the segment is given.

Thus, the weight of each segment of the fluid column 34 may be conveniently and accurately determined using the method 60. Importantly, in the method 60 both the temperature and pressure of each segment are used in calculating the density of the segment. This method is far more accurate than relying on an estimation of the overall average temperature and average density of the fluid column 34 to determine the weight of the entire fluid column.

Note that in step 68 of the method 60, a determination is made as to whether the last segment has been reached. If so, then the method is terminated. If not, then steps 64-68 are repeated for the next segment in succession.

In summary, a temperature of each segment of the fluid column 34 is determined in step 62 and then, for each segment in succession (starting at the proximal end of the fluid column 34 and proceeding to the distal end) the pressure in that segment and the density of that segment are determined. When the last segment is reached (at the distal end of the fluid column 34), the pressure at the distal end can be conveniently calculated as the pressure applied to the fluid column at the surface, plus the pressure due to the accumulated weight of all vertically higher segments.

Figure 7:
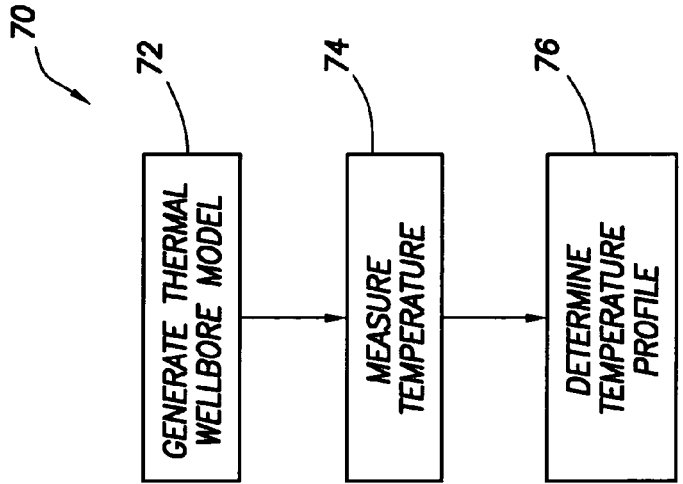

Referring additionally now to FIG. 7, a technique 70 for determining the temperature of each segment of the fluid column 34 is representatively illustrated in flowchart form. The technique 70 may be used in step 62 of the method 60 in the event that a direct measurement of the temperature of each segment is not available.

In an initial step 72 of the technique 70, a thermal wellbore model is generated. A thermal wellbore model is a mathematical representation of the thermal characteristics of a wellbore, and is based on physical properties of the wellbore, the surrounding environment, thermal properties of fluids and solids, dynamic characteristics (such as fluid flow rate), etc. For example, significant parameters in constructing a thermal wellbore model for the wellbore 14 may include the dimensions of the wellbore, the dimensions of the tubular string 12, casing, cement, etc., wellbore inclination or deviation, the undisturbed geothermal gradient, the heat capacity and conductivity of the formation 16, the location and number of perforations, the physical properties of fluids flowing between the wellbore and the formation, the flow rate, etc.

An acceptable thermal wellbore model which may be used in step 72 is Wellcat-Prod™ available from Halliburton Energy Services, Inc. of Houston, Tex.

In step 74, a temperature measurement is made. The sensor 22 may be used for the temperature measurement. If the sensor 24 is used, then temperature measurements made by either or both of the sensors may be used in the step 74.

In step 76, a temperature profile for the fluid column 34 is determined. The temperature profile provides a correlation between depth and temperature in the wellbore 14. In this manner, the temperature of each segment of the fluid column 34 may be determined.

The temperature profile is generated by the thermal wellbore model. In one alternative, the thermal wellbore model may generate a series of possible temperature profiles. In that case, the proper temperature profile to use in the method 60 is determined by selecting the temperature profile which corresponds to the temperature measurement in step 74.

That is, if in step 74 a temperature T1 is measured at depth D1, then the proper temperature profile will include the temperature T1 at depth D1. The other possible temperature profiles generated by the thermal wellbore model will preferably not include the temperature T1 at depth D1. If in step 74 multiple temperature measurements T1, T2 are made at respective multiple depths D1, D2 (for example, using the sensors 22, 24), then the proper temperature profile will include the temperature T1 at depth D1, and will also include the temperature T2 at depth D2.

Instead of using the measured temperature(s) to select from among multiple possible temperature profiles generated by the thermal wellbore model, an alternative is to input the measured temperature(s) and depth(s) to the thermal wellbore model (for example, as boundary conditions). In this manner, the thermal wellbore model can output the proper temperature profile, without a need for selecting from among multiple possible temperature profiles. In basic terms, the measured temperature(s) allows the thermal wellbore model to be "calibrated" for the particular circumstances and configuration of the well system 10.

In practice it may be impractical or inconvenient to have the thermal wellbore model generate the temperature profile at the time the temperature is measured. Instead, using specific well information (such as depth of the chamber 28, well deviation, fluid column properties, etc.) the thermal wellbore model may be used to generate multiple possible temperature profiles. A range of expected surface pressure readings can then be used in conjunction with the possible temperature profiles to calculate the pressure applied downhole due to the fluid column weight (i.e., by calculating the pressure and density in each of the fluid column segments as described above) for each combination of temperature profile and surface pressure reading.

At the jobsite, the measured temperature and surface pressure reading are then used to select the appropriate pressure applied downhole due to the fluid column weight. Thus, it will be appreciated that the steps of the technique 70 could be performed in any order, without departing from the principles of the invention. For example, the temperature profile could be generated by the thermal wellbore model prior to measuring the temperature in step 74.

In some circumstances, a temperature measurement in the well may not be available. For example, a temperature sensor may not have been installed in the wellbore 14, or a previously installed sensor may have malfunctioned, etc. In this case, other factors may be used to enable the thermal wellbore model to generate a proper temperature profile, or to appropriately modify a previously determined temperature profile.

Figure 8:
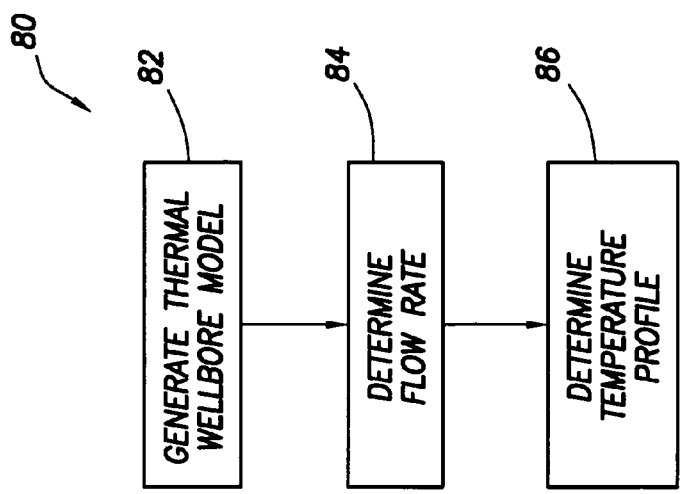
FIGS. 7 & 8 are flowcharts for alternate steps in a temperature determining portion of the method.

Referring additionally now to FIG. 8, a technique 80 is representatively illustrated in flowchart form. This technique allows a thermal wellbore model to use a flow rate of fluid in the well to generate a proper temperature profile, or to modify a previously determined temperature profile.

Flow rate is used in the technique 80, since it is known that flow rate is a significant factor in determining the temperature profile of a wellbore. For example, if flow is completely stopped, the wellbore temperature profile will gradually correspond to the geothermal gradient for the well location. If flow increases, then temperature in the well will change accordingly. Note that production and/or injection flow rates may be used in the technique 80.

In step 82, the thermal wellbore model is generated. This step is similar to the step 72 in the technique 70.

In step 84, the flow rate is determined. The flow rate could be measured directly, for example, one or both of the sensors 22, 24 could include a flowmeter, or a flowmeter could be located at the surface. Alternatively, the flow rate could be derived from other measurements, for example, pressure could be measured using a gauge or other sensor 88 as an indication of flow rate. A pressure differential across a calibrated choke, orifice or venturi may also be used as an accurate indicator of flow rate.

In step 86, the flow rate is used in conjunction with the thermal wellbore model to determine the proper temperature profile. The flow rate may be input as a boundary condition to the thermal wellbore model, so that the thermal wellbore model outputs the proper temperature profile. Alternatively, the thermal wellbore model may have been previously "calibrated" as described above, for example, using measured temperature(s) and depth(s) at a certain previous flow rate. In that case, the current flow rate determined in step 84 may be used to modify the thermal wellbore model, so that an updated temperature profile is generated for the current flow rate.

Similar to the temperature measurement described above for the technique 70, it is not necessary for the flow rate to be determined prior to generating the temperature profile. Instead, using specific well information (such as depth of the chamber 28, well deviation, fluid column properties, etc.) the thermal wellbore model may be used to generate multiple possible temperature profiles. A range of expected surface pressure readings can then be used in conjunction with the possible temperature profiles to calculate the pressure applied downhole due to the fluid column weight (i.e., by calculating the pressure and density in each of the fluid column segments as described above) for each combination of temperature profile and surface pressure reading.

At the jobsite, the measured flow rate and surface pressure reading are then used to select the appropriate pressure applied downhole due to the fluid column weight. Thus, it will be appreciated that the steps of the technique 80 could be performed in any order, without departing from the principles of the invention. For example, the temperature profile could be generated by the thermal wellbore model prior to measuring the flow rate in step 84.

Each of the techniques 70, 80 described above allows an appropriate temperature profile to be determined for use in correcting the surface pressure measurements for the weight of the fluid column 34. The temperature profile is useful in step 62 of the method 60 for determining the temperature of each of the segments of the gas column 34. However, it should be clearly understood that other techniques may be used for determining a wellbore temperature profile, without departing from the principles of the invention.

The enhanced accuracy in downhole pressure measurements provided by the principles of the invention can be of substantial benefit in various phases of well operations. For example, production and/or injection monitoring can benefit from the greater accuracy provided by the methods described herein.

Another well operation which can utilize the principles of the invention is well testing. In one type of well test, the well is shut in and a pressure buildup is monitored. The manner in which the pressure buildup occurs enables certain important characteristics of the formation or zone 16 to be determined. Improved accuracy in the pressure measurements will result in corresponding improved accuracy in the determinations of the formation characteristics.

Representatively illustrated in FIG. 9 is a graph 90 depicting an example of a recorded pressure buildup during a well testing operation. A vertical axis on the graph 90 represents pressure recorded at the surface Ps, and a horizontal axis on the graph represents time t.

As discussed above, when a well is shut in (i.e., the flow is completely stopped, whether at the surface or downhole) its temperature profile gradually changes. Therefore, it will be appreciated that the temperature profile of the wellbore 14 will be different at different points 92, 94 during the pressure buildup. Therefore, in order to increase the accuracy of the downhole pressure measurements using the method 60, the appropriate temperature profile for each of the points 92, 94 (and all other points along the pressure buildup) should be used when correcting the surface pressure measurements for the weight of the fluid column 34.

Referring additionally now to FIG. 10, a graph 100 of multiple possible temperature profiles 102, 104, 106, 108, 110 is representatively illustrated. A vertical axis on the graph 100 represents depth D in the wellbore 14 (increasing from top to bottom on the graph), and a horizontal axis on the graph represents temperature T in the wellbore (increasing from left to right on the graph). The temperature profiles 102, 104, 106, 108, 110 may be generated, for example, by a thermal wellbore model of the type described above.

The temperature profile 110 corresponds to the geothermal gradient for the well location. The temperature profile 102 corresponds to the temperature distribution in the wellbore 14 at a certain flow rate prior to the well being shut in, for example, at point 96 on the graph 90. It will be appreciated by those skilled in the art that, upon shut in, the temperature profile will gradually change from the profile 102 to each of the profiles 104, 106, 108 in succession, and then eventually to the geothermal gradient profile 110.

A determination can be made as to which of the temperature profiles 104, 106, 110 corresponds to each of the points along the pressure buildup shown in the graph 90. For example, it may be determined that the temperature profile 104 corresponds to the point 92, and that the temperature profile 108 corresponds to the point 94. In this manner, the appropriate temperature profile can be used to correct the surface pressure measurements Ps made during the well test for the weight of the gas column 34 using the method 60.

Referring additionally now to FIG. 11, this technique 120 of correcting well test pressure measurements is representatively illustrated in flowchart form. The technique 120 is described as being used for a pressure buildup when a well is shut in, but it will be appreciated that similar techniques may used for pressure decreases during a drawdown test, and for other types of well tests and other well operations (such as production and/or injection monitoring, stimulation treatments, completion operations, etc.).

In step 122, the well is shut in. This may be accomplished in various ways, such as by closing a choke or valve at the surface, installing a testing tool in the tubular string 12 via wireline, etc.

In step 124, the pressure is measured at the surface. For example, the gauge or sensor 32 may be used to monitor and record the pressure buildup. The recorded pressure measurements may be similar to that shown in the graph 90 of FIG. 9.

In step 126, the appropriate temperature profiles for each of the pressure measurements are determined. As described above, a thermal wellbore model may be used to generate the temperature profiles.

In step 128, the pressure measurements are corrected for the weight of the fluid column 34 using the method 60 as described above, with the appropriate temperature profile for each pressure measurement being used in the method to determine the temperature of each of the segments of the fluid column. In this manner, the corrected pressure measurements may be used for more accurately determining the characteristics of the formation or zone 16.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A method of determining pressure at a distal end of a fluid column in a subterranean well, the method comprising the steps of:
   dividing the fluid column into multiple segments;
   determining a temperature of each fluid column segment by measuring a first temperature in the well near a proximal end of the fluid column, and using the first measured temperature in conjunction with a thermal wellbore model to thereby generate a temperature profile of the fluid column; and
   for each successive fluid column segment extending toward the distal end of the fluid column, determining a pressure in the fluid column segment and determining a density of the fluid column segment, and wherein the pressure determining step includes determining a weight applied to each successive fluid column segment by vertically higher fluid column segments.

2. The method of claim 1, wherein the pressure determining step further comprises summing a pressure applied to the fluid column by a pressure source with a pressure due to the weight applied to each successive fluid column segment.

3. The method of claim 1, wherein the density determining step further comprises determining the density based on a relationship between the pressure in each fluid column segment, the temperature of each fluid column segment and the density of each fluid column segment.

4. The method of claim 1, wherein the temperature determining step further comprises positioning an optical conductor proximate the fluid column in the well.

5. The method of claim 1, wherein the first temperature measuring step further comprises measuring the first temperature at a position below a tubing hanger.

6. The method of claim 1, wherein the temperature determining step further comprises measuring a second temperature in the well spaced apart from the proximal end of the fluid column.

7. The method of claim 1, wherein the temperature determining step further comprises inputting the first temperature to a thermal wellbore model, and in response the thermal wellbore model generating the temperature profile of the fluid column.

8. The method of claim 1, wherein the temperature determining step further comprises selecting one of multiple temperature profiles generated by the thermal wellbore model, the selected temperature profile including the first temperature at a depth at which the first temperature is measured.

9. A method of determining pressure at a distal end of a fluid column in a subterranean well, the method comprising the steps of:
   causing a pressure change in the fluid column;
   monitoring the pressure change over a time period, thereby recording multiple pressure measurements;
   generating a temperature profile of the fluid column for each of the pressure measurements, each of the temperature profiles corresponding to a respective one of the pressure measurements at a time the pressure measurement is recorded; and
   for each of the pressure measurements, determining a corrected pressure at the distal end of the fluid column using the respective temperature profile,
   wherein the step of generating the temperature profile further comprises generating multiple possible temperature profiles, and further comprising the step of determining a corresponding weight of the fluid column based on each of the possible temperature profiles, and wherein the step of determining the corrected pressure further comprises selecting the fluid column weight based on at least one of a measured temperature and a measured flow rate.

10. The method of claim 9, wherein the step of determining the corrected pressure further comprises the steps of:
   dividing the fluid column into multiple segments;
   determining a temperature of each fluid column segment using the respective temperature profile; and
   for each successive fluid column segment extending toward the distal end of the fluid column, determining a pressure in the fluid column segment and determining a density of the fluid column segment.

11. The method of claim 9, wherein the step of determining the corrected pressure further comprises the steps of:
dividing the fluid column into multiple segments;
determining a temperature of each fluid column segment by measuring a temperature in the well near a proximal end of the fluid column, and using the measured temperature in conjunction with a thermal wellbore model to thereby generate the respective temperature profile of the fluid column; and
for each successive fluid column segment extending toward the distal end of the fluid column, determining a pressure in the fluid column segment and determining a density of the fluid column segment.

\* \* \* \* \*